April 2, 1963
C. W. MORRIS
3,083,525
DEVICE FOR MODIFYING EXHAUST GASES FROM
INTERNAL COMBUSTION ENGINES
Filed Feb. 21, 1961
5 Sheets-Sheet 1
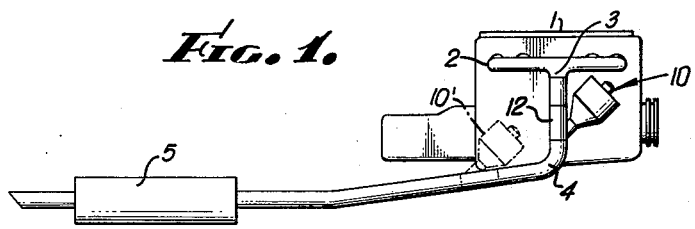
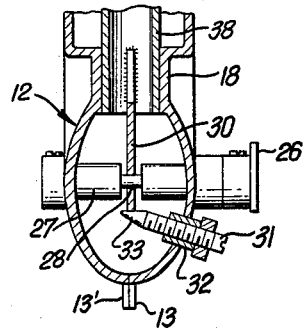
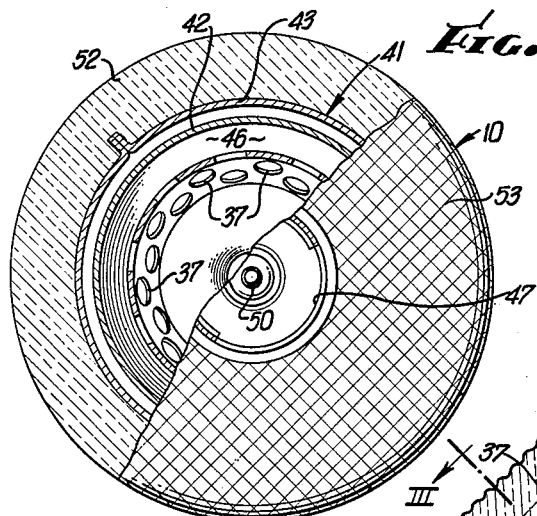
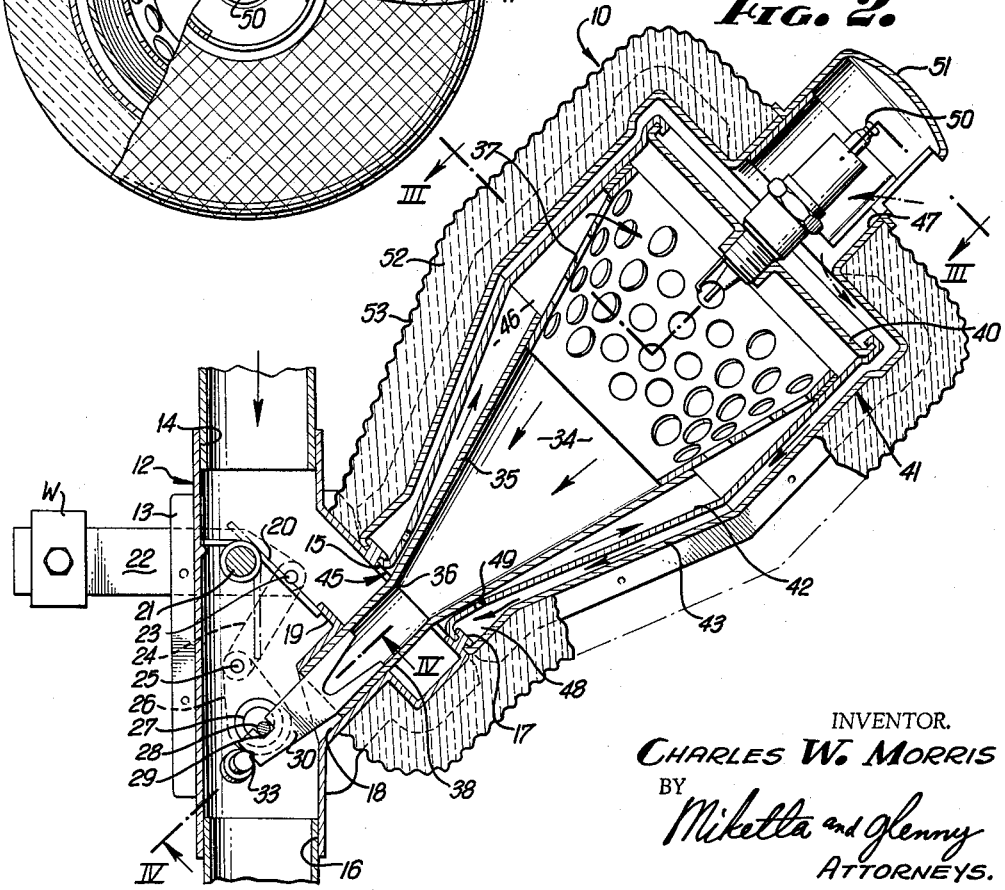
INVENTOR.
CHARLES W. MORRIS
BY
Miketta and Glenny
ATTORNEYS.

April 2, 1963 C. W. MORRIS 3,083,525
DEVICE FOR MODIFYING EXHAUST GASES FROM
INTERNAL COMBUSTION ENGINES
Filed Feb. 21, 1961 5 Sheets-Sheet 2
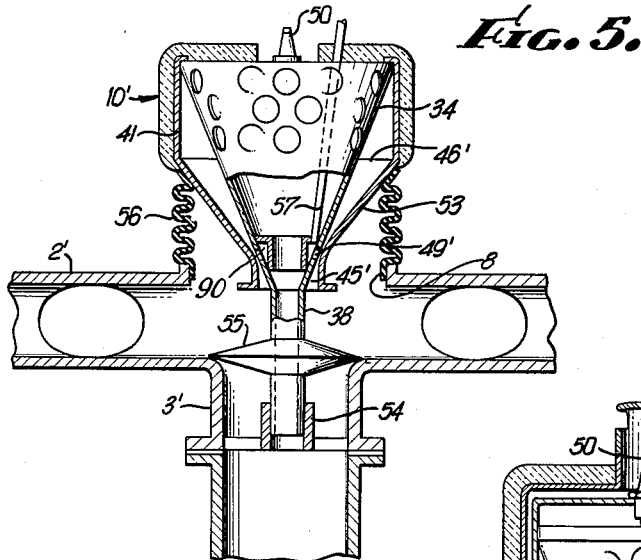
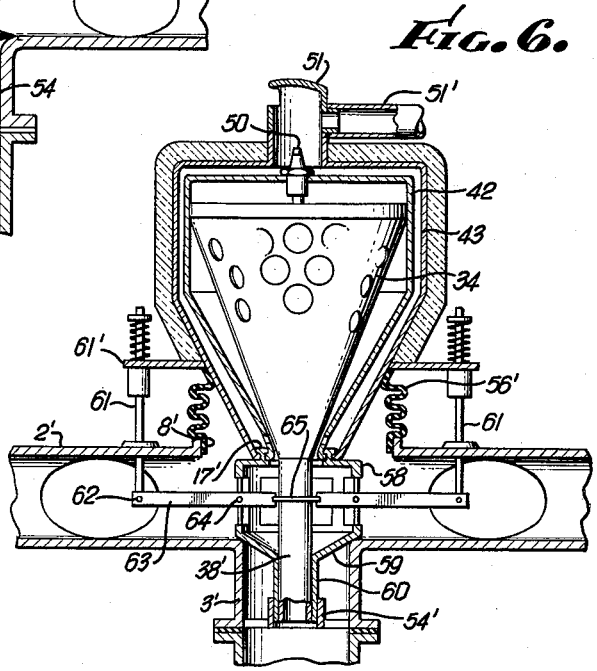
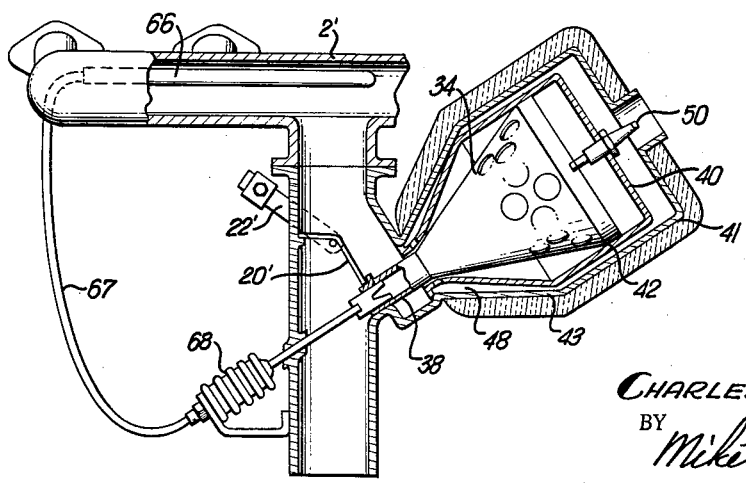
INVENTOR.
CHARLES W. MORRIS
BY Miketta and Glenny
ATTORNEYS.

April 2, 1963

C. W. MORRIS 3,083,525

DEVICE FOR MODIFYING EXHAUST GASES FROM
INTERNAL COMBUSTION ENGINES

Filed Feb. 21, 1961

INVENTOR.
CHARLES W. MORRIS
BY
Miketta and Glenny
ATTORNEYS.

INVENTOR.
CHARLES W. MORRIS
BY Miketta and Glenny
ATTORNEYS.

April 2, 1963  C. W. MORRIS  3,083,525
DEVICE FOR MODIFYING EXHAUST GASES FROM
INTERNAL COMBUSTION ENGINES
Filed Feb. 21, 1961  5 Sheets-Sheet 5
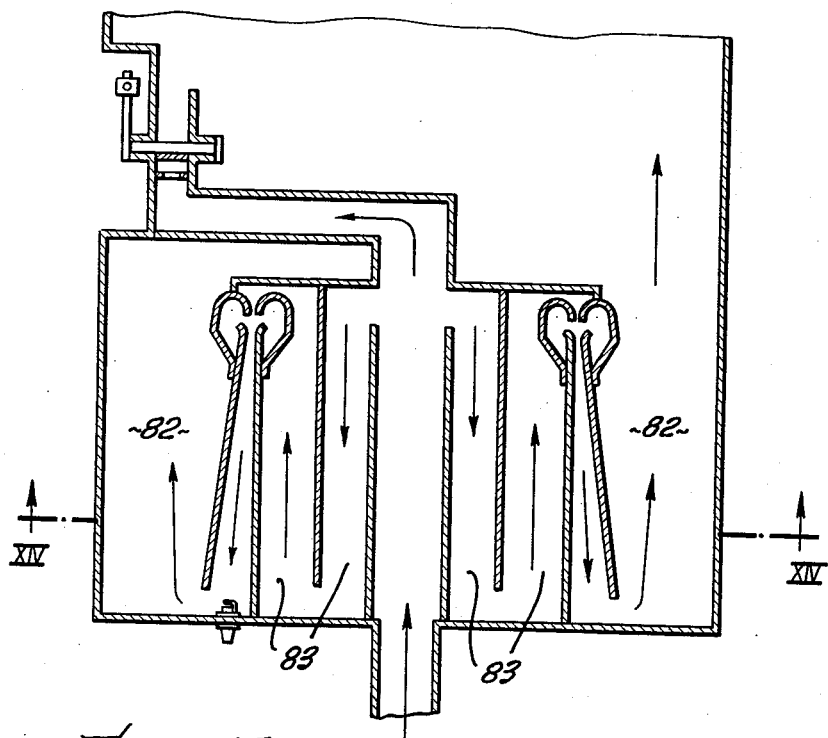
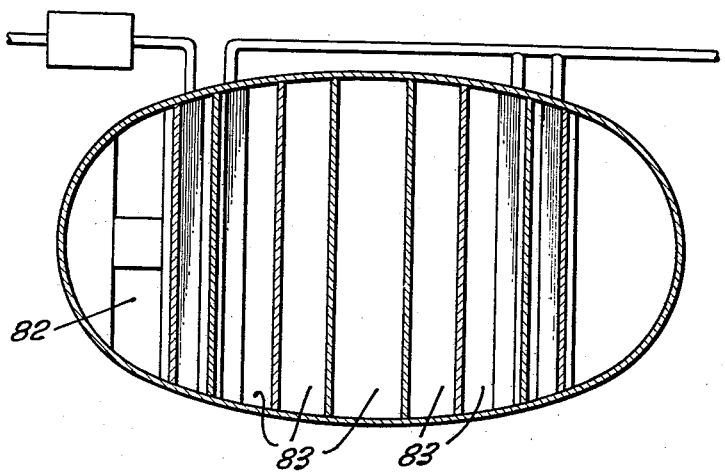
INVENTOR.
CHARLES W. MORRIS
BY
Miketta and Glenny
ATTORNEYS.

United States Patent Office 3,083,525
Patented Apr. 2, 1963

3,083,525
DEVICE FOR MODIFYING EXHAUST GASES
FROM INTERNAL COMBUSTION ENGINES
Charles W. Morris, 11769 Chenault St.,
Los Angeles, Calif.
Filed Feb. 21, 1961, Ser. No. 90,783
7 Claims. (Cl. 60—30)

This invention relates to a device for reducing the content of hydrocarbons, carbon monoxide, oxides of nitrogen and other noxious components in exhaust gases from internal combustion engines, and for increasing the temperature of such exhaust gases sufficiently to not only subject them to substantially complete combustion but also to prevent condensation of the exhaust gases in the mufflers, thereby eliminating corrosion. The invention also pertains to a compact, lightweight, inexpensive construction of a device which is free from numerous adjustable parts, is readily installed and is capable of eliminating those components generally attributed as the primary cause of air contamination, such contamination being commonly referred to as smog. This application is a continuation-in-part of applicant's copending prior application Serial No. 10,405 filed February 23, 1960, now Patent No. 3,037,344.

Studies have established that the contamination of the atmosphere in and around metropolitan centers is primarily due to the presence of hydrocarbon gases. It has also been established that the major contributing cause to such atmospheric polution is the tremendous volume of hydrocarbon gases and carbon monoxide discharged into the atmosphere from the exhausts and crankcases of automobiles and other vehicles driven by internal combustion engines. During idling and deceleration the exhaust gases carry very large quantities of hydrocarbons and of carbon monoxide; during acceleration at ordinary cruising speeds the hydrocarbon content of the gases is not excessive. In metropolitan areas the progress of an automotive vehicle is a succession of idling periods interspersed with bursts of acceleration and periods of rapid deceleration; as a result, extremely large quantities of carbon monoxide and hydrocarbon vapors are discharged into the atmosphere. Research has shown that during deceleration as high as 15% of the fuel is actually pumped out of the exhaust system in an unburned condition.

The extremely detrimental effects of this smog upon the health of the population, animals, vegetable growth, visibility etc. has become evident to almost all of the inhabitants of a metropolitan area. Many attempts have been made to minimize the effects of this smog. Many attempts have been made to modify the gases discharged from the exhausts of internal combustion engines, but prior attempts in this direction have involved complicated arrangements, the utilization of catalysts, and other expensive installations which are neither feasible nor practical.

The flexibility of an internal combustion engine introduces a number of problems. The operating conditions of an internal combustion engine may be classified as idling, deceleration, acceleration and cruising speeds; the hydrocarbon content of exhaust gases varies greatly under these different operating conditions. For example, during idling and deceleration the hydrocarbon content of the exhaust gases is high whereas during acceleration and cruising the hydrocarbon content is relatively low. An average internal combustion engine of the character used in an automobile may carry 400 p.p.m. of hydrocarbons in its exhaust during idling. This may drop to 200 p.p.m. during acceleration and cruising but during deceleration the hydrocarbon content of the gases being exhausted may readily reach 5500 p.p.m. Similarly, the carbon monoxide content of the exhaust gases may vary from 6% during idling, to 2½% during acceleration, to 0.5% during cruising and rise to 4% during deceleration. It is to be remembered that temperatures above 1200° F. are required to cause combustion of carbon monoxide; temperatures 1500° to 2000° F. are necessary in order to obtain complete combustion of carbon monoxide. The exhaust temperature (at the outlet of an exhaust manifold of an internal combustion automobile engine) may vary from 400°–600° F. during deceleration to about 800° F. during idling, 800°–900° F. during cruising speeds and reach temperatures of 1100°–1200° F. during acceleration. None of these temperatures are sufficiently high to actually burn or cause combustion of carbon monoxide. Another variable which must be taken into consideration comprises the volumetric flow of exhaust gases; the volumetric flow is ordinarily low during idling and deceleration but is high during acceleration and cruising. Moreover, the pressure of the exhaust gases also varies within wide limits. The pressure of the exhaust gases is ordinarily low during idling and deceleration but is quite high during acceleration and cruising.

In addition to the effect on exhaust gases, the various operating conditions have a major effect on the vent gases from the crankcase. Of course, at all times during the operation of an internal combustion engine, a significant amount of evaporation takes place from the hot oil in the crankcase and these vapors are usually discharged to the atmosphere through the oil filling aperture. However, during cruising and particularly during acceleration, the quantity of vent gases from the crankcase is greatly increased because combustion gases from the cylinders blow by the pistons into the crankcase. In fact, the quantity of crankcase vent gases in total is so great that it has been estimated that it contributes 10% to 40% of all the noxious gases discharged by vehicles such as hydrocarbons and carbon monoxide.

These varying characteristics of an internal combustion engine and its exhaust gases present problems which have been deemed insurmountable heretofore. As previously indicated prior attempts have involved such complicated systems and such material modifications of the normal carburetors, cooling systems etc. as to render the prior devices totally unacceptable. A device capable of being used on millions of automobiles and trucks must be simple and effective without the necessity of employing an engineer to operate the device; the average owner of an automobile is not in position to spend a large sum of money upon a device of a complicated nature requiring hours of labor in order to adapt and install the device to his vehicle.

One way which the hydrocarbon and carbon monoxide products can be rendered innocuous is to complete their oxidation to water and carbon dioxide. However such combustion process requires large quantities of oxygen or air in excess of stoichiometric amounts in order to insure that it will be carried to completion. As already noted, such combustion process also requires high temperatures so it is necessary that these large amounts of air be supplied to a device which maintains these high temperatures so that the combustion process may proceed. In practice, this means that any such combustion device or afterburner should receive at least about 2 cu. feet of air for every 10 cu. feet of engine discharge gases. Prior art devices either just ignored this problem which resulted in relatively incomplete combustion or required complicated, additional pumping devices to charge the necessary air into the afterburner.

The present invention is directed to a device which may be installed not only on new vehicles but also on cars and trucks now in service. It is to be remembered that for every new automotive vehicle there are approximately seven vehicles of older vintage now in service and it is essential that these older vehicles be equipped with devices which correct, ameliorate and render innocuous the exhaust gases being discharged thereby. The present invention is therefore directed to a device which is readily attached to automobiles and trucks now in service; it is directed to a small compact device which does not require modification of existing vehicles. In fact, the present invention, if desired, may readily be attached to the mufflers presently used in vehicles without adding substantially to their size. The invention is directed to a device which is capable of effectively destroying or minimizing the hydrocarbon and carbon monoxide content of exhaust gases from internal combustion engines without requiring periodic charging with fresh catalyst or regeneration of catalyst.

The present invention furthermore is directed to a device in which operative temperatures are rapidly reached so that the device operates effectively in a period of time which is shorter than that required for the usual water jacket temperatures to reach optimum. It relates to a device that can be manufactured economically in large quantities, sold at a reasonable price and installed by any mechanic without difficulty. It does not require the attachment to or interference with carburetors or cooling systems. It does not impose a drain upon the electrical system of a vehicle. It is not necessary to have a device of the present invention of a different size for internal combustion engines which differ in volumetric displacement by as much as 100%; the same device can be adjusted and effectively used on either a four-cylinder, six-cylinder or eight-cylinder engine.

In general, the present invention comprises a method and apparatus for completing the combustion of discharge gases from an internal combustion engine in the absence of catalysts by admixing the proper amount of air at high temperature and igniting the resulting mixture with a spark. The apparatus includes a venturi having the usual diffusion chamber and a throat for admitting exhaust gases from an internal combustion engine into the diffusion chamber. The throat also has gas ports at the points of minimum static pressure of the exhaust gases passing through the throat. These gas ports are continually supplied with air and crankcase vent gases from the internal combustion engine. A burner chamber opens into the diffusion chamber and is in heat exchange relation to the diffusion chamber. The burner chamber has ignition means adjacent the opening to the diffusion chamber. Also the apparatus includes means for by-passing a portion of the exhaust gases in response to the physical characteristics of the exhaust gases so that when the total volume of the exhaust gases increases, the proportion of air mixed therewith is reduced.

One of the objects of the present invention is to disclose and provide a small, compact, inexpensive device which may be readily attached not only to new internal combustion engines and vehicles employing the same but which can also be readily adapted and attached to existing vehicles employing internal combustion engines for the purpose of reducing the hydrocarbon and carbon monoxide content of exhaust gases discharged from said engine.

Another object of this present invention is to disclose and provide a small compact and simple device which does not employ catalysts and in which operative temperatures are rapidly reached so that the major proportion of carbon monoxide contained in the exhaust gases may be consumed and burned, the temperature of the exhaust gases being thus increased sufficiently so as to prevent condensation of exhaust gases in the mufflers of the vehicles, thereby increasing the life of such mufflers.

A still further object of the invention is to disclose and provide a device capable of burning exhaust gases with air added in approximate accordance with variation in the hydrocarbon content of said gases under different operating conditions of the engine, such variation being accomplished automatically and without the use of complicated or expensive machinery or instrumentation.

Again an object of the present invention is to disclose and provide a device for modifying the hydrocarbon and carbon monoxide content of exhaust gases from an internal combustion engine, a device of substantially the same size being adaptable to internal combustion engines which differ in volumetric displacement by as much as 100%.

Another object of the present invention is to not only treat the crankcase vent gases to render them harmless but also to utilize them so that they aid the treating of the exhaust gases.

Still another object of the present invention is a compact device for treating vehicle discharge gases which can be installed in the mufflers of present vehicles without substantially increasing their size.

Moreover, the present invention is directed to a device for modifying and correcting the hydrocarbon and carbon monoxide content of exhaust gases of internal combustion engines, the device being inexpensive and capable of being readily installed by any mechanic without difficulty.

These and various other objects, uses and advantages of the present invention will become apparent to those skilled in the art from the following detailed description of certain exemplary forms that this invention may assume in actual practice. In order to facilitate understanding, reference will be had to the appended drawings in which:

FIG. 1 is a diagrammatic side view of an internal combustion engine and its exhaust system equipped with one form of my device;

FIG. 2 is an enlarged axial section taken through one form of device of the character illustrated in FIG. 1;

FIG. 3 is a transverse section taken along the broken plane III—III in FIG. 2;

FIG. 4 is a partial section taken along the plane IV—IV in FIG. 2;

FIG. 5 is a simplified drawing illustrating a modified form of device, which may be factory installed on new automobiles.

FIG. 6 is a partial section of another form of device, as a part of an exhaust manifold, including means for converging fumes from a crankcase into the device.

FIG. 7 is a still further modification.

FIG. 13 is a longitudinal section of another form of the device installed in a muffler taken along the plane IX—IX of such muffler.

FIG. 14 is a transverse section taken along the plane XIV—XIV in FIG. 13.

Figure 9:
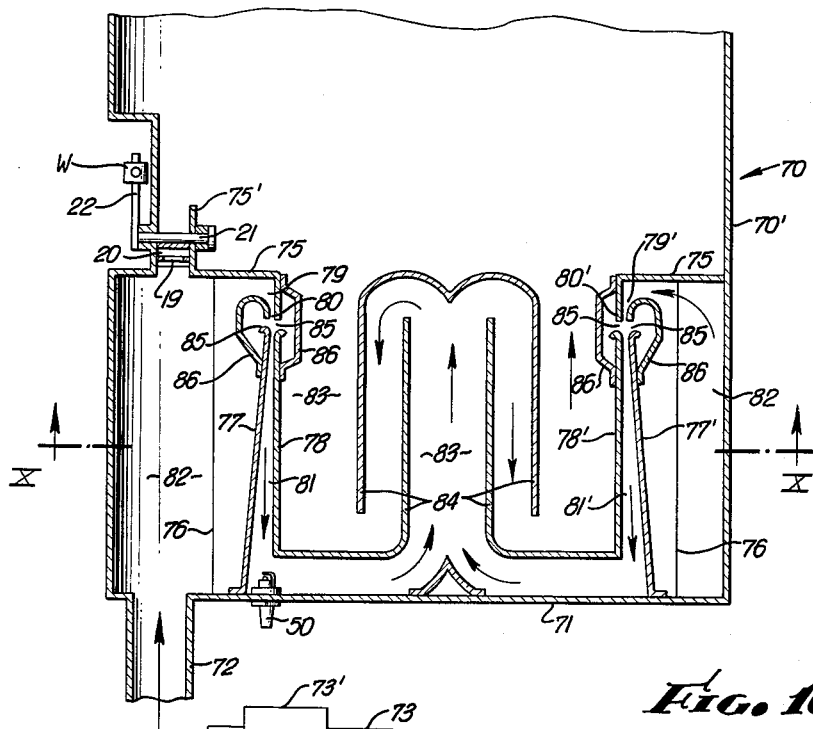
FIG. 9 is a longitudinal section taken along the plane IX—IX in FIG. 8.

The ease with which the device of the present invention may be installed in a conventional internal combustion engine-exhaust system is exemplified by FIG. 1. As there shown, the internal combustion engine 1 is provided with the usual exhaust manifold 2 having an exhaust outlet 3. Ordinarily such exhaust manifold is connected as by means of a pipe 4 with a muffler 5. The present device, generally indicated by the numeral 10, is attached to and interposed between the exhaust muffler 5 and the exhaust pipe 4. A portion of the normal exhaust pipe 4 may be cut away and means provided for attaching the device 10 so as to be in the path of the normal exhaust gases from the manifold. Such installation may be accomplished by any mechanic and by the use of suitable adapters, variations in diameter of exhaust pipe, etc. may be readily compensated for. The presence of auxiliary equipment to the side of the internal combustion engine 1 (such as generators, batteries, etc.) does not interpose an obstacle since the device 10 may be placed in different position so as to avoid such auxiliary equipment, for example, in the position indicated by dash lines at 10'. The entire device 10 occupies not more than one-half cubic foot of space and generally only about one-third of a cubic foot of space, and such small volume can be readily installed in a number of positions along the exhaust pipe 4 between the exhaust manifold 2 and the muffler 5.

Although a device embodying the mode of operation of the present invention may assume many forms and modifications, the exemplary form shown in FIGS. 2, 3 and 4 is simple, effective and illustrates the teachings of this invention. My device, generally indicated at 10, includes a hollow connector fitting 12 which may be made of two stamped metal halves, each provided with flanges 13 and 13' the flanges being connected (as by spot welding) to make the connector sufficiently rigid. One end of fitting 12 is provided with port 14 for connection to a source of exhaust gases, as an exhaust manifold; a side port 15 directs such incoming gases into the device 10; lower port 16 constitutes an outlet for treated gases and such outlet port 16 is generally connected to the exhaust pipe leading to a muffler of customary construction. It is to be understood that adjacent the ports 14 and 16 the fitting may be provided with flanges, adapters or other expedient means for attaching the fitting to pipe of different diameters, flanged manifold parts, etc. Such expedients are within the skill of a mechanic.

It may be noted that an externally extending, headed connector bead 17 is circularly arranged around port 15 in order to facilitate attachment of device 10 to such port. Moreover, the fitting 12 is provided with a cylindrical guide 18 which is coaxial with port 15. The guide 18 may carry a flange 19 which acts as a limit stop for an unbalanced butterfly valve 20, carried by pivot axis 21. The valve 20 and flange or stop 19 normally guide exhaust gases from port 14 to port 15 during idling and deceleration, the valve being in the position shown in full lines. The valve is biased into this full line position by a spring or an adjustably positionable weight W on arm 22 connected to pivot pin 21. The end of arm 22 opposite the weight may be pivotally connected at 23 to link 24 which is, in turn, pivotally connected at 25 to crank 26. Crank 26 is mounted on one end of rod 27 (which is journaled in the side walls of the connector fitting), the rod 27 having an eccentric actuating pin 28. The operation and utility of this arrangement will become apparent subsequently.

The main portion of device 10 is virtually conical in longitudinal section and circular in transverse section. Centrally disposed within the device is a burner member defining and enclosing a burner chamber 34; the burner member is substantially conical and comprises an imperforated conical wall portion 35 adjacent the smaller open outlet end 36 and an enlarged conical end portion having the ported wall portion 37. A cylindrical extension 38, connected to wall portion 35, carries gases from the open outlet port into fitting 12, the cylindrical extension 38 being slidably received in guide 18. The enlarged end of the burner chamber 34 is closed by means of a transverse partition 40 attached to the inner wall 42.

In the form of device illustrated, the housing 41 is shown as being double-walled and including an inner wall 42 and an outer wall 43, these walls being in spaced relation. Inner wall member 42 may be formed as by spinning from tubular or conical stock, carries the transverse portion 40 at its enlarged end and is partitioned by attaching the smaller end to beaded connector 17 adjacent port 15. The inner surface of housing wall member 42 is in spaced relation to the outer surface of the smaller imperforated wall portion 35 of the burner member and cooperates therewith to provide an annular gas intake and venturi throat 45 around the outlet end of the burner member. The included angle of conical wall portion 35 of the burner member is smaller (say 40°–46°) so that gases admitted through annular inlet 45 and the venturi throat pass into an enlarged expansion diffusion and preheating chamber 46. The larger and outer end portion of housing wall member 42 may be cylindrical and is in contact with the marginal large end portion of the burner member, thus directing gases from the diffusion and preheating chamber 46 through the ported wall portion 37 into the burner chamber 34. Partition 40 carries a spark plug 50 (or other igniting means) extending into the burner chamber.

Outer housing wall member 43 may be formed in two halves which may be joined along an axial plane by spot welding outstanding parting plane fins or in any other suitable manner. The smaller, inner end of wall member 43 may grasp connector 17 or be connected to fitting 12 in any other manner. The outer end of housing member 43 is provided with an air intake port 47. The outer housing member 43 is spaced from the inner wall member 42 and air from intake port 47 may flow through such space between the walls to the annular chamber 48 formed around the venturi throat 45 and be discharged into the stream of gases passing at high velocity through such throat through a plurality of spaced ports 49 of constant cross section. Suitable spacing between housing wall member 42 and 43 may be established by scattered inwardly extending deformations in wall member 43, use of spacing pins etc.

A protective weather cap 51, having a large opening in one side may be carried at the air intake port 47. The entire housing is preferably covered with high-temperature heat insulation 52 (such as matted glass fiber or asbestos) and an external layer of rigidized metal foil 53 (metal foil and wire mesh).

From the description given, it will be observed that hot exhaust gases from an internal combustion engine admitted through port 14 of the fitting will pass through the annular port 45 into the throat of the venturi and air (admitted through intake 47 into annular chamber 48) will be sucked in preheated form through ports 49 into such stream of exhaust gases. This mixture of gases is mixed and further heated in diffusion chamber 46 and their velocity is greatly reduced by the time the mixture passes through the burner chamber 34. The mixture is ignited by the spark plug 50 in the burner chamber and is discharged through the relatively small outlet 36 into the fitting and out the outlet port 16. It is not necessary to use flame arresters in the burner chamber since the volume is sufficient to reduce the velocity of the gases (in the upper and larger end of the chamber) to below flame-propagation velocity.

In order to facilitate the maintenance of high temperatures within the burner under different operating conditions and enhance heat exchange, a piece of expanded metal lath or other arrangement of heat resisting metal or alloy (having mass but not offering resistance to flow of gases therethrough) may be placed in and across the burner chamber 34 to contact the larger end walls of covered portion 35, such metal liberating radiant heat and enhancing mixing of the gases.

Exhaust gases from an internal combusion engine which is under cruising load or which is accelerating are at relatively high temperatures (800°–1200° F.) and contain relative low proportions of hydrocarbons and carbon monoxide. A very small proportion of air need be added to such exhaust gases, which will be supplied to the device in relatively high volume and pressure. During idling and deceleration exhaust gases are at lower temperatures (400°–800° F.), are supplied in lower volume and at low pressures but carry a high proportion of hydrocarbons and a large proportion of air need be mixed therewith to assure combusion. Means are provided whereby an adequate amount of air is admitted at all times to maintain combustion in the burner chamber under all engine load and operating conditions, by maintaining an air intake of constant cross-sectional area. In the illustrated device air intake 47 is always open and ports 49 are always open and of constant cross section. Means are also provided to vary the proportion of air sucked into the exhaust gases inversely with respect to the flow of exhaust gases through the venturi. This inverse relationship is not mathematically perfect, but is an approximation; the means of this invention permit addition of air in approximate accordance with the variation in hydrocarbon content of the supplied gases under different operating conditions of an engine. Again attention is drawn to average automobile engine exhausts. During acceleration we have high volume gas flow and only about 200 p.p.m. of hydrocarbons in the exhaust gases. During deceleration we have low volume gas flow and 5000–5400 p.p.m. of hydrocarbons.

In accordance with the mode of operation of my invention, the device can be regulated and controlled and the hereinabove inverse relationship can be obtained by bypassing some exhaust gases or by controllable relative movement between the housing and burner member. In the form illustrated, the burner member (and particularly imperforate wall 35 thereof) can be moved axially with respect to the housing wall member 42 to effectively vary the width of the throat of the annular venturi and thereby, by increasing the throat width, larger volumes of exhaust gases can pass therethrough and a smaller relative proportion of air will be added thereto. When the throat width is reduced, smaller volume of gases may pass therethrough at the same velocity, so that a larger proportion of air is added to such gases.

Movement of the elements with respect to each other to attain the benefits of this invention may be produced in a number of different ways. Such movement may or may not be accompanied by a bypassing of proportion of exhaust gases directly into the usual muffler system, thereby reducing the load on my device. Such axial movement may be imparted to the burner member of my invention by volumetric changes of a temperature sensitive device responsive to temperature variations in the exhaust gases being discharged by the internal combustion engine, or by a pressure-sensitive device responsive to pressure change in such exhaust gases (note: exhaust gas pressures during acceleration and cruising are five to ten times as great as during idling and deceleration), or by devices sensitive to variations in volumetric flow, or by a combination of devices.

In the device of FIGS. 2–4, the cylindrical extension 38 is provided with a medial fin 30 having a notch 29 through which eccentric 28 extends. During acceleration and cruising, or whenever high flow and high pressure conditions exist in the exhaust gases supplied to port 14, unbalanced or biased valve 20 will move into partly open position and such movement is translated (by link 24, arm 26 and eccentric 28) into axial movement of the burner member, such movement increasing the width of the venturi throat and thereby reducing the proportion of air sucked into the gases traversing such throat. Simultaneously, a portion of the incoming exhaust gases are caused to bypass the device, the partially open valve permitting some gases to pass directly from inlet 14 to outlet 16.

The bypass valve 20 may also be used to reduce the proportion of oxides of nitrogen in the exhaust gases. This effect can be obtained by having the valve 20, when it opens to bypass some exhaust gas directly to the muffler or atmosphere, to simultaneously open a separate port and conduit of predetermined area leading to a cooling coil or other cooler so as to permit a proportion (about 10%–20%) of the exhaust gases to be diverted to the cooler, cooled to atmospheric temperature or below 150° F. and then passed into the intake manifold of the engine. Valve 20 may have an upstanding lip which normally closes such separate port. In this manner the valve recirculates exhaust gases to the intake manifold only when such gases have a high proportion of nitric and nitrous oxides and such recirculation reduces the total content of these components eventually discharged to the muffler or atmosphere.

The width of the throat in the venturi varies (during operation) by less than 0.1 inch and is preset for minimum width and optimum effectiveness, which may be on the order of only 0.040–0.050 inch. Such minimum setting can be readily obtained by a vernier stop such as set screw 31 threadedly held in the threaded bore of an insert 32 carried by the wall of fitting 12. The conical end 33 of the set screw acts as an adjustable stop against the end of fin 30.

The extreme thinness of the width of the venturi throat (0.040–0.050 in.) produces several advantages in the present invention. One advantage is that applicant's device greatly increases the total perimeter enclosing the venturi throat with respect to the cross sectional area of the venturi throat and thus makes a much larger area available for gas ports in the wall of the venturi throat. Another advantage is that the gas admitted through the gas ports into the stream of exhaust gases passing through the venturi throat need diffuse only the minimum distance to become completely mixed with the exhaust gases.

It must be remembered that the flow in a venturi is substantially laminar so that mixing will be only by diffusion. These advantages can be illustrated by reference to either applicant's annular or rectangular venturis. Under the temperature and pressure conditions existing in the exhaust manifold, approximately 6–10 cubic feet per minute of exhaust gas is discharged. For such volume of flow, design considerations determine that the venturi have a cross sectional throat area of about 0.20 in.$^2$. If the usual circular venturi is used then to obtain an area of 0.20 in.$^2$ its throat would have a radius of about 0.25 in. and its ratio of perimeter to area would be about 8. However if applicant's annular venturi is used with a width of 0.040 in. then the ratio of perimeter to area would be about 50. Likewise for applicant's rectangular venturi with a width of 0.040 in., the ratio of perimeter to area would be about 50. In addition with the circular design, the added gas must diffuse 0.25 in. to be mixed while with applicant's design, it need travel only 0.020 in. or less than $\frac{1}{12}$ the distance of the circular design. Hence by using a ratio of overall perimeter to cross sectional area in the venturi throat above about 30 and preferably above 40, applicant's device achieves the aforementioned advantages.

It is to be understood that the spark plug is connected to the electrical system of the engine and is energized whenever the ignition system is turned on. The burner member and at least the inner wall member of the housing is made of heat-resisting metal or alloy since temperatures as high as 2000° F. are reached in the chamber 34. Nickel alloys or chrome-treated steel have been found effective. The device may be placed in any desired position; it occupies less than one-half cubic foot of space (for automobile engine use). Effective treatment of exhaust gases can require the addition of from two to five cubic feet of air per minute.

Devices embodying the heat-exchange relationships and mode of operation of this invention may take many forms. In simplified form, the conical combustion chamber is located in an optimum position of venturi clearance and the opening of the bypass valve under influence of the higher pressures induced by higher exhaust gas flows prevents the introduction of excessive amounts of air at the venturi in relation to the total exhaust flowing from the engine. This arrangement also makes the venturi sensitive to providing adequate air induction at low exhaust gas flows without serving as a block to high exhaust gas flow condition and impairing engine performance. FIG. 5 shows this arrangement. When made as an integral part of a new engine or automotive system, the device may assume the form illustrated in FIG. 5.

The device 10' illustrated in FIG. 5 is a part of an exhaust manifold 2' and is mounted with the cylindrical extension 38 of the burner member axial with respect to manifold outlet 3'. The cylindrical outlet extension may be slidably received by a guide sleeve 54 held by a spider unitary with the manifold outlet. The outlet extension may carry an obturating element 55 arranged to close the manifold outlet during low pressure conditions in the manifold. The outer housing 53 is single walled and cooperates with the conical burner member to form venturi intake 45' and an expansion zone 46'. (The same numbers are being used on similar parts in order to facilitate comparison and understanding.)

The entire device is supported over a port 8 formed in the exhaust manifold, by a cylindrical, pressure-responsive bellows 56. The ends of the bellows are connected to the manifold and the outer housing of the device.

The device of FIG. 5 differs from the previously described device in that the burner member carries an annular air chamber 90 which is supplied with air by tube 57 extending through the burner chamber and into the atmosphere. Also chamber 34 is fixed in relation to wall 53 so that the width of the venturi throat is fixed. A plurality of spaced, fixed orifice ports 49' communicate the annular air chamber with the venturi.

The operation of a device of the type shown in FIG. 5 can be readily understood in the light of the preceding discussions. During idling and deceleration all of the exhaust gases pass through the venturi, pick up air, expand, pass into the enlarged burner chamber, are ignited and then discharged through the outlet and exhaust pipe attached to the exhaust manifold outlet. During acceleration and cruising, the exhaust gases are at a materially higher pressure; this pressure expands the bellows and raises the device so as to partially open the manifold outlet port and bypass a portion of the gases.

FIG. 6 is a more sophisticated form of device shown installed in an exhaust manifold. The arrangement of inner and outer housing wall portions and axially contained and movable burner member is the same as in FIG. 2. The headed connector 17' is now a part of an open cage 58 having a bottom 59 which normally rests on and closes the manifold outlet. Such bottom is provided with a tubular extension 60 in which the cylindrical extension 38' of the burner chamber is slidably received; such tubular extension, in turn, is slidably received in guide sleeve 54' of the manifold outlet.

The outer housing portions (and open cage 58) are supported by the expandable bellows 56' which surround port 8' in the manifold. The housing may be provided with an outstanding ring 61', guide rods 61 being carried by the manifold and extending through such ring. Springs bearing against such ring and adjustable stops on the guide rods limit and modify the action of the bellows.

Each of the rods 61 may extend into the manifold and act as a fulcrum point 62 for a lever 63 which is also pivotally connected at a pivot pin support 64 to cage 58, the inner end of the lever being forked and grasping an annular bead or flange 65 carried by the outer surface of the cylindrical extension of the burner member. Pivot pin 64 should be closer to the forked end than to the fixed pivot 62.

In operation, the device of FIG. 6 causes all exhaust gases to pass through the venturi during low gas pressure, idling or deceleration conditions. During acceleration (or while running under load) the bellows expands and raises the housing and cage 58 thereby bypassing some exhaust gases directly into the manifold outlet. Levers 63 simultaneously move the inner burner member with respect to the housing so as to increase the effective width of the venturi, for purposes and with the results hereinbefore explained.

Fumes and gases are usually discharged from a crankcase through the oil filling aperture. During acceleration, combustion gases blow by the pistons into the crankcase and the blowby gases from the oil-filling vent may amount to 1.6 c.f.m. with a hydrocarbon content as high as 6000 p.p.m. My invention contemplates conducting such blowby gases from the crankcase to the atmospheric air intake of my devices, to consume such hydrocarbons, and thereby further prevent pollution of the atmosphere. Conduit 51' exemplifies a gas-conducting element whose other end is in communication with a vent from the crankcase.

FIG. 7 illustrates a further modification of the device shown in FIG. 2 in that a temperature responsive device 66 (which may be a bulb filled with a substance exhibiting expansion in the range of about 650°–750° F.) is positioned in the exhaust manifold and connected, as by flexible pressure tube 67 to a bellows 68 which imparts axial movement to the inner burner member and thereby changes the effective width of the venturi throat. The temperature of the exhaust gases is low during idling and deceleration and under such conditions the venturi is not as wide, gas velocities through it are high and an increased amount of air is sucked in. It will also be noted that a biased bypass valve 20' is used, and the counterbalance arm 22' moves along an arc (in response to increase in exhaust gas pressure) which applies a differential torque to the valve shaft.

Figure 8:
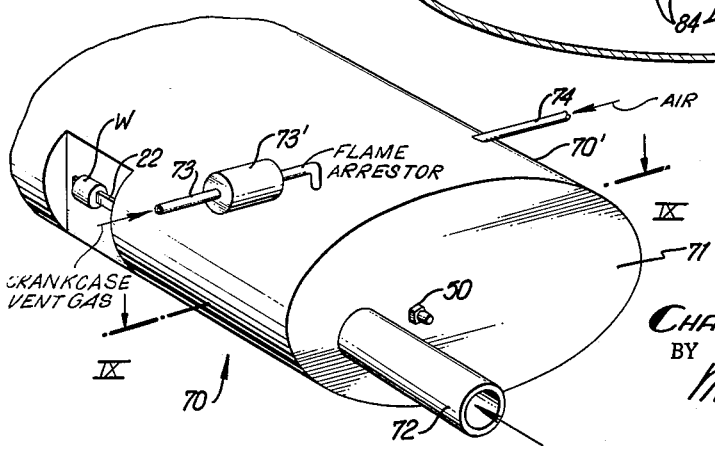
FIG. 8 is a perspective view of another form of the device which shows a muffler with the device installed.

As already noted, the device of the present invention may be installed in a muffler without substantially increasing its size. FIG. 8 shows such a muffler with one form of the device installed within it and the associated exterior piping required. In FIG. 8, the muffler 70 has an end wall 71. The exhaust gases from an internal combustion engine enter muffler 70 through an inlet pipe 72 in wall 71. The crankcase vent gases from the same engine enter muffler 70 through inlet pipe 73 and a flame arrester 73' in muffler housing 70' while air enters through inlet pipe 74. The same bypass valve as shown in FIGS. 2 and 7 is used in the device in FIG. 8. The external biasing mechanism for the bypass valve is shown as arm 22 with an adjustable weight W.

Figure 10:
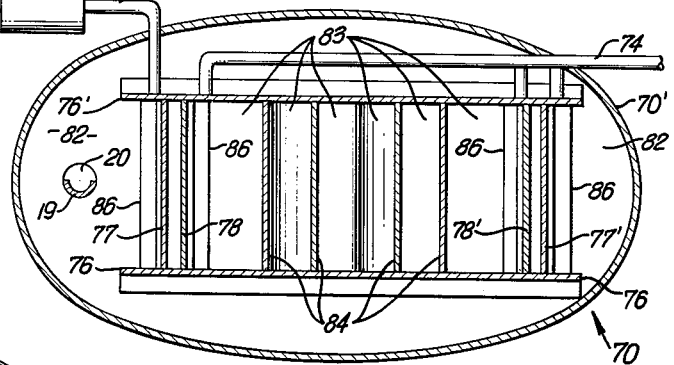
FIG. 10 is a transverse section taken along the plane X—X in FIG. 9.

The construction of the form of the device installed in muffler 70 of FIG. 8 is shown in FIGS. 9 and 10. In FIGS. 9 and 10, first end wall means 71 closes the end of the afterburner section of the muffler 70 which is remote from the main portion of the muffler 70. Second end wall means 75 closes the end of the afterburner section adjacent the main portion of the muffler 70. In the afterburner section of the muffler 70 are two, substantially parallel panels 76 and 76' in spaced relation to the muffler housing 70' connecting walls 71 and 75 in gas-tight connection.

Connecting panels 76 and 76' in gas-tight connection are two pairs of partitions, 77, 78, 77' and 78'. Partition pair 77 and 78 forms a venturi having a rectangular, transverse cross section with an entry zone 79, a throat zone 80 and a diffuser zone 81. Similarly partition pair 77' and 78' form a venturi with an entry zone 79', a throat zone 80' and a diffuser zone 81'. The adjacent inner members of the partition pairs 78 and 78' are joined to the second end wall means 75 forming a gas-tight seal therewith and they terminate adjacent first end wall means 71. The remote outer members of the partition pairs 77 and 77' are joined to first end wall means 71 forming a gas-tight seal therewith and they terminate adjacent the second end wall means 75. Consequently, there is formed in the afterburner section, an outer preheating chamber 82 and an inner burner chamber 83 separated by panels 76 and 76' and the venturis formed by partition pairs 77, 78, 77' and 78'.

Inner burner chamber 83 is connected to the diffusion zones 81 and 81' of the venturis by first openings in the inner partitions 78 and 78'. Outer preheating chamber 82 is connected to the entry zones 79 and 79' of the venturis by second openings in the outer partitions 77 and 77'. Consequently, exhaust gases can flow from the outer preheating chamber into the inner burner chamber through the venturis.

Exhaust gases enter the outer preheating chamber 82 through inlet pipe 72 in wall 71. Exhaust gases can flow directly from the outer preheating chamber 82 into the main portion of muffler 70 through an outlet pipe 75' in wall 75. In outlet pipe 75' is the unbalanced butterfly valve 20 as shown in FIGS. 2 and 7 with a pivot axis 21 and stop 19. In inner burner chamber 83 are baffles 84 which commingle the exhaust gases discharged by the venturis and direct them in counterflow, heat exchange relation to inner partitions 78 and 78' to the opening in wall 75. Combustion gases are discharged from the inner burner chamber 83 through the opening in wall 75 into the main portion of muffler 70.

Each of the partitions 77, 78, 77' and 78' contain gas ports 85 in the throat zones 80 and 80' of the venturis at the point of minimum static pressure of the exhaust gases passing through said throat zones. Separating gas ports 85 from the inner burner chamber 83 and outer preheating chamber 82 are wall means 86 which are connected to panels 76 and 76' and partitions 77, 78, 77' and 78' in gas-tight connections and enclose the space adjacent to the gas ports 85. Air is conducted to said gas ports in three of said four partitions through inlet pipe 74. Crankcase vent gases are conducted to said gas ports in the fourth of said four partitions through inlet pipe 73 and flame arrester 73'. A sparkplug 50 is inserted in wall 71 adjacent the opening between inner burner chamber 83 and the diffusion zone 81 of the venturi to which the crankcase vent gases are supplied.

From the foregoing description, it will be observed that the hot exhaust gases from an internal combustion engine admitted through inlet pipe 72 will pass through entry zones 79 and 79' into the throat zones 80 and 80' of the venturis. Air admitted through inlet pipe 74 and crankcase vent gases admitted through inlet pipe 73 into the space enclosed by wall means 86 will be sucked in preheated form through ports 85 into the exhaust gases passing through throat zones 80 and 80'. This mixture of gases is mixed and further heated in diffusion zones 81 and 81' and ignited by sparkplug 50 and charged into inner burner chamber 83. From inner burner chamber 83, the burning gas mixture passes into the main portion of muffler 70.

The particular device shown in FIGS. 9 and 10 has certain advantages which are common to all of the devices of the present invention. For example, such device has its throat gas ports located at the point of minimum static pressure of the exhaust gases passing through the throat of the venturi so the maximum amount of air and crankcase vent gases will be added to the exhaust gases. This feature is of particular importance because it insures continuous, efficient operation of the afterburner.

As already noted, efficient combustion requires the maximum amount of air.

In addition, as already shown, during periods of acceleration and cruising, the hydrocarbon content of the exhaust gases is at a minimum while the hydrocarbon content of the crankcase vent gases is at a maximum. On the other hand during deceleration and idling, the situation is exactly reversed. Consequently, by mixing the crankcase vent gases with the exhaust gases the hydrocarbon content of the mixture becomes much more stable over all operating conditions of the internal combustion engine and "flame out" i.e. loss of burning conditions in the afterburner is substantially inhibited. Without the addition of the crankcase vent gases, the exhaust gases during cruising or acceleration can become too lean to support burning in the afterburner.

However, the particular device shown in FIGS. 9 and 10 does have its own special advantages. As already noted such device can be installed in the muffler without substantially increasing the size of the muffler. This advantage is achieved by utilizing rectangular venturis with fixed throat areas rather than annular venturis with variable throat areas. Of course it should be noted that the device shown in FIG. 5 has a fixed throat area but its venturis are annular. In addition, the device shown in FIGS. 9 and 10 mixes the crankcase vent gases with only a portion of the exhaust gases rather than all the exhaust gases. This design virtually insures that the resulting mixture will not become too lean and that combustion will be maintained at all times in the burner chamber. In FIGS. 13 and 14, substantially the same device shown in FIGS. 9 and 10 is illustrated except that the inner chamber 83 is the preheating chamber and the outer chamber 82 is the burner chamber.

Figure 11:
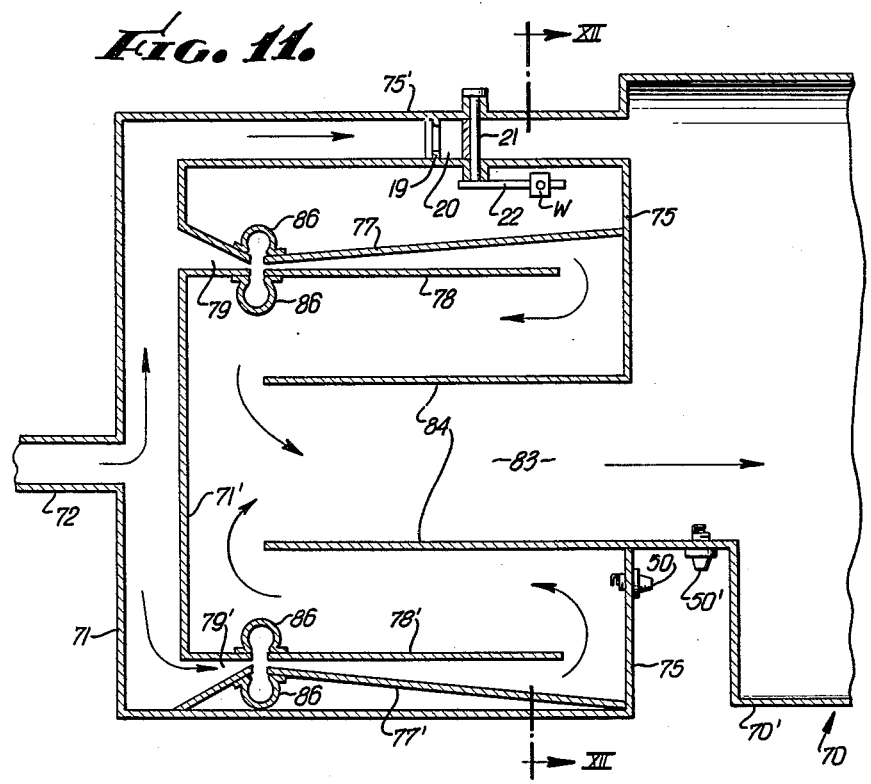
FIG. 11 is a longitudinal section of another form of the device installed in a muffler taken along the plane IX—IX of such muffler.
Figure 12:
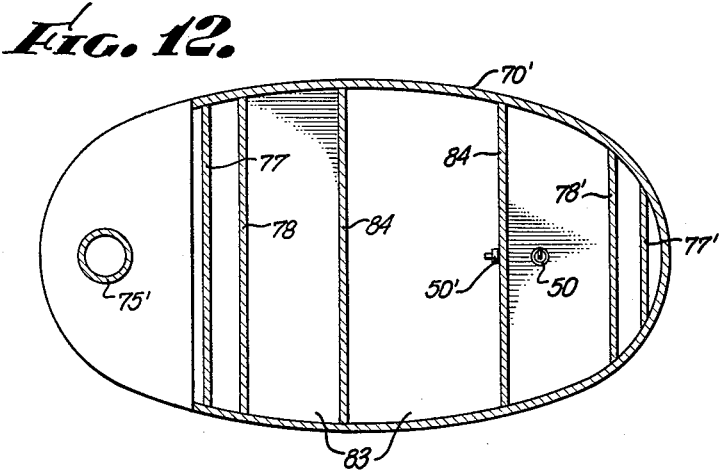
FIG. 12 is a transverse section taken along the plane XII—XII in FIG. 11.

Another form of the present device particularly designed for installation in a muffler is shown in FIGS. 11 and 12. In FIGS. 11 and 12, the muffler 70 has a housing 70' with an end wall 71 through which exhaust gases enter from an internal combustion engine by means of inlet pipe 72. As in FIGS. 9 and 10 the same unbalanced butterfly valve 20 with pivot axis 21, flange 19, arm 22 and adjustable weight W is used in outlet pipe 75' which conducts exhaust gases directly to the main portion of muffler 70 from inlet pipe 72. A second end wall means 75 closes the end of the afterburner section adjacent the main portion of the muffler.

In the afterburner section of the muffler 70 shown in FIGS. 11 and 12, the two pairs of partitions 77, 78, 77' and 78' connect opposite portions of housing 70' in gas-tight connection. Each partition pair forms a venturi having a rectangular, transverse cross section. A first end wall means 71' adjacent wall 71 and connecting opposite portions of housing 70' in gas-tight connection connects the ends of adjacent inner members of the partition pairs 78 and 78' in gas-tight connection. Inner members 78 and 78' terminate adjacent second end wall means 75. The remote outer members of the partition pairs 77 and 77' connect first end wall means 71' and second end wall means 75 in gas-tight connection. Remote outer member 77' abuts second end wall means 75 and the side wall, as shown in FIG. 11, in gas-tight connection. Consequently there is formed an inner combustion zone 83 between members 78 and 78' with baffles 84.

The device of FIGS. 11 and 12 differs from the device of FIGS. 9 and 10 in that inlet pipe 72 connects directly to the entry zones 79 and 79' of the venturis through the space between walls 71 and 71'. Also the partition pairs may connect directly to housing 70' and a second sparkplug 50' in addition to sparkplug 50 insures that the combustion mixture leaving inner combustion zone 83 is ignited.

There are, of course, many variations which can be made of the devices shown in FIGS. 9–12 without varying the basic device. The device could be installed in mufflers of any shape or size e.g. a muffler with a rectangular transverse cross section. When installed, the longitudinal axis of the rectangular venturis is preferably parallel to the longitudinal axis of the muffler but it may be at any angle, even at a right angle. Of course, two rectangular venturis are preferred but only one or more than two may be used depending upon the volume of gas which must be handled. Also it is preferred that the two venturis face in the same direction for simplicity of flow pattern but they may face in opposite directions.

In feeding exhaust gases to the rectangular venturis, it is preferred to use a preheating chamber fed by a normal single exhaust pipe from the exhaust manifold but if two exhaust gas inlet pipes are used, the venturis may be fed directly through them. When using a preheating chamber, it may be preferred to locate the by-pass valve in it rather than in the combustion chamber due to the lower temperatures involved. However, the by-pass valve can be located externally of the muffler by use of a separate by-pass pipe as in FIGS. 11 and 12. The openings between the rectangular venturis and other chambers such as the preheating chamber, combustion chamber or air inlet chamber are preferably single large ports extending the full height of the partitions forming the venturis so that resistance to gas flow is minimized. However the openings may also be a series of circular ports or single large ports centrally located in the partitions forming the venturis.

The foregoing description and examples are only illustrative of the present invention and are not limitations on its scope since many other specific embodiments will be obvious to one skilled in the art in view of my disclosure. All alterations, modifications and variations of the present invention which are obvious to one skilled in the art or come within the scope of the following claims are considered as part of the present invention.

I claim:

1. An afterburner for the discharge gases from an internal combustion engine whereby combustion of said discharge gases is completed by admixing the proper amount of air and spark ignition, comprising: an elongated, cylindrical housing having an elliptical transverse cross section attached to the end of a muffler with a first wall closing the end of said housing remote from said muffler and a second wall closing the end of said housing adjacent said muffler; two, substantially parallel panels within and in spaced relation to said housing, extending substantially parallel to the axis of the cylindrical housing, connecting said walls in gas-tight connection; two, substantially parallel pairs of partitions between said panels extending substantially perpendicular to said panels and connecting said panels in gas-tight connection, each pair forming a venturi having a rectangular, transverse cross section with an entry zone, a throat zone and a diffusion zone and extending substantially parallel to the axis of the cylindrical housing, the adjacent inner members of said partition pairs being joined to said second wall forming a gas-tight seal therewith and terminating adjacent said first wall, and the remote outer member of said partition pairs being joined to said first wall forming a gas-tight seal therewith and terminating adjacent said second wall, whereby an inner burner chamber and an outer preheating chamber are formed in said housing between said walls separated by said panels and venturis; an opening in each of the inner members of said partition pairs connecting the inner burner chamber with the diffusion zones of said venturis and an opening in each of the outer members of said partition pairs connecting the outer preheating chamber with the entry zones of said venturis, whereby exhaust gases can flow from said outer preheating chamber into said inner burner chamber through said venturis; inlet means in said first wall for charging exhaust gases from said internal combustion engine into said outer preheating chamber; outlet means in said second wall responsive to the physical characteristics of the exhaust gases for discharging a portion of said exhaust gases directly from said outer preheating chamber into said muffler; baffle means in said inner burner chamber, said baffle means being arranged to commingle the exhaust gases discharged by said venturis and direct them in counterflow, heat-exchange relation with said inner partitions to said outlet means for said inner burner chamber; outlet means in said second wall for discharging combustion gases from said inner burner chamber into said muffler; means including gas ports in three of said four partitions for conducting air to the throat zones of said venturis; means including gas ports in the fourth partition of said four partitions for conducting crankcase vent gases from said internal combustion engine to the throat zone of the venturi formed by said partition at the point of minimum static pressure of exhaust gases passing through said throat zone; and ignition means in said inner burner chamber adjacent the opening between said inner burner chamber and the venturi to which said crankcase vent gases are supplied.

2. An afterburner for receiving discharge gases from an internal combustion engine whereby combustion of said discharge gases is completed by admixing thereto a proper amount of air and crankcase vent gases and spark ignition of the resultant mixture, comprising: an elongated enclosed cylindrical housing with at least one side wall, a first end wall means and a second end wall means; two spaced pairs of partitions within said housing, each of said pairs of partitions including an inner member and a remote outer member forming a venturi having a rectangular transverse cross section with an entry zone, a throat zone and a diffusion zone, the inner members of said pairs of partitions being joined to said second end wall means at one end of said venturis and terminating adjacent to said first end wall means forming therebetween first openings and the remote outer members of said pairs of partitions being joined to said first end wall means and terminating adjacent to said second end wall means forming therebetween second openings, whereby an inner burner chamber is formed in said housing between said two spaced pairs of partitions and at least one outer preheating chamber is formed within said housing between one of said two spaced pairs of partitions and said housing, said chambers being separated by said partitions with said first openings interconnecting the inner burner chamber with the diffusion zones of said pairs of partitions and said second openings interconnecting the outer preheating chamber with the entry zones of said pairs of partitions whereby exhaust gases may flow from said outer preheating chamber into said inner burner chamber through said venturis formed by said partitions; inlet means for charging exhaust gases from said internal combustion engine into said outer preheating chamber; outlet means responsive to the physical characteristics of the exhaust gases for discharging a portion of said exhaust gases directly from said outer preheating chamber; outlet means for discharging combustion gases from said inner burner chamber; means including ports in said partitions for conducting air and crankcase vent gases from said internal combustion engine to the throat zones of said venturis formed by said pairs of partitions; and ignition means in said inner burner chamber adjacent one of the first openings between said inner burner chamber and one of said pairs of partitions.

3. An afterburner for the discharge gases from an internal combustion engine whereby combustion of said discharge gases is completed by admixing a proper amount of air and crankcase vent gases with spark ignition of the resultant mixture, comprising: an elongated, enclosed cylindrical housing with at least one side wall, a first end wall means and a second end wall means; two spaced pairs of partitions within said housing, each of said pairs of partitions including an inner member and a remote outer member forming a venturi having a rectangular, transverse cross section with an entry zone, a throat zone and a diffusion zone, the remote outer members of said pairs of partitions being joined to the second end wall means and terminating adjacent to the first end wall means forming therebetween first openings and the inner members of said pairs of partitions being joined to the first end wall means and terminating adjacent to the second end wall means forming therebetween second openings, whereby an inner preheating chamber is formed in said housing between said inner members of said pairs of partitions and at least one outer burner chamber is formed within said housing between said remote outer members and said housing, said chambers being separated by said pairs of partitions with said first openings interconnecting the outer burner chamber with the diffusion zones of said venturis formed by said pairs of partitions and said second openings interconnecting the inner preheating chamber with the entry zones of said venturis formed by said pairs of partitions, whereby exhaust gases may flow from said inner preheating chamber into said outer burner chamber through said venturis formed by said pairs of partitions; inlet means for charging exhaust gases from said internal combustion engine into said inner preheating chamber; outlet means responsive to the physical characteristics of the exhaust gases for discharging a portion of said exhaust gases directly from said inner preheating chamber; outlet means for discharging combustion gases from said outer burner chamber; means including ports in said partitions for conducting air and crankcase vent gases from said internal combustion engine to the throat zones of said venturis formed by said pairs of partitions; and ignition means in said outer burner chamber adjacent one of the first openings between said outer burner chamber and one of said pairs of partitions.

4. An afterburner for the discharge gases from an internal combustion engine, whereby combustion of said discharge gases is completed by admixing a proper amount of air and crankcase vent gases with spark ignition of the resultant mixture, comprising: an elongated enclosed cylindrical housing with at least one side wall, a first end wall means and a second end wall means; two spaced pairs of partitions within said housing, each of said pairs of partitions including an inner member and a remote outer member forming a venturi having a rectangular transverse cross section with an entry zone, a throat zone and a diffusion zone, the inner members of said pairs of partitions being joined to the first end wall means and terminating adjacent to the second end wall means forming therebetween first openings and the remote outer members of said pairs of partitions being joined at least to the second end wall means, whereby an inner burner chamber is formed between said inner members of said pairs of partitions, said first openings between said inner members and said second end wall means interconnecting said inner burner chamber with said diffusion zones of said venturis formed by said pairs of partitions whereby discharge gases may flow into said burner chamber from said venturis; inlet means for charging exhaust gases from said internal combustion engine into the entry zones of said venturis; outlet means responsive to the physical characteristics of the exhaust gases for discharging a portion of said exhaust gases directly from said exhaust gas inlet means; outlet means for discharging combustion gases from said inner burner chamber; means including ports in said partitions for conducting gases comprising air to the throat zone of said venturis formed by said pairs of partitions; and ignition means in said inner burner chamber adjacent one of said first openings between the inner burner chamber and one of said pairs of partitions.

5. An assembly for use in a muffler to control and pretreat discharge gases from an internal combustion engine, comprising: two substantially parallel panels; two substantially parallel pairs of partitions disposed between said panels and extending substantially perpendicular thereto interconnecting said panels in gas-tight connections, each of said pairs of partitions including inner and outer members forming a venturi having a rectangular, transverse cross section with an entry zone, a throat zone and a diffusion zone, whereby an inner combustion zone is formed between said panels and said pairs of partitions and outer preheating zones are formed between said panels, said pairs of partitions and walls of a muffler when said assembly is installed in a muffler, said preheating zones being separated by said pairs of partitions, said inner members including an opening therein interconnecting the diffusion zones of said venturis with said inner combustion zone and said outer members of said partitions including an opening interconnecting the entry zones of the venturis with said outer preheating zones whereby exhaust gases may flow from said outer preheating zone into said inner combustion zone through said venturis formed by said pairs of partitions; inlet means for charging exhaust gases from said internal combustion engine into said outer preheating zones; means responsive to the physical characteristics of the exhaust gases for discharging a portion of said exhaust gases directly from said outer preheating zone; baffle means in said inner combustion zone, said baffle means being arranged to commingle the exhaust gases discharged by said venturis and direct said exhaust gases in counterflow heat exchange relation with said inner members of said pairs of partitions to said outlet means for said inner combustion zone; outlet means for discharging combustion gases from said inner combustion chamber; means including gas ports in at least three of the partitions of said two pairs of partitions for conducting air to the throat zones of the venturis formed by said pairs of partitions; means including gas ports in a fourth partition of said two pairs of partitions for conducting crankcase vent gases from said internal combustion engine to the throat zone of the venturi formed by the pair of partitions including said fourth partition; and ignition means in said inner combustion zone adjacent the opening between said inner combustion zone and said last named venturi to which said crankcase vent gases are supplied.

6. An assembly for use in a muffler to control and pretreat discharge gases from an internal combustion engine, comprising: two spaced panels; two spaced pairs of partitions between said panels and connecting said panels, each of said pairs of partitions forming a venturi having a rectangular transverse cross section with an entry zone, a throat zone and a diffusion zone, whereby an inner combustion zone is formed between said panels and said pairs of partitions when said assembly is installed in a muffler; an opening in each of the inner members of said pairs of partitions interconnecting the inner combustion zone with the diffusion zones of said venturis formed by said pairs of partitions, whereby discharge gases may flow into said inner combustion zone from said venturis; inlet means for charging exhaust gases from said internal combustion engine into the entry zones of said venturis; outlet means responsive to the physical characteristics of the exhaust gases for discharging a portion of said exhaust gases directly from said exhaust gas inlet means; outlet means for discharging combustion gases from said inner combustion zone; means including ports in said partitions for conducting gases comprising air to the throat zones of said venturis; and ignition means in said inner combustion zone adjacent the opening between said inner combustion zone and one of said venturis formed by said pairs of partitions.

7. A device for use with an internal combustion engine muffler for completing the combustion of discharge gases from an internal combustion engine in the absence of catalysts by admixing thereto a proper amount of air and crankcase vent gases at high temperature and spark ignition of the resultant mixture, comprising: wall means including two spaced pairs of partitions, each of said partitions including inner and outer members defining a venturi having a diffusion chamber and a throat for admitting exhaust gases from an internal combustion engine into the diffusion chamber; gas ports in said wall means to admit gases into the venturi throats of said pairs of partitions; means for continually supplying gas consisting of air and crankcase vent gases from an internal combustion engine to said gas ports; a burner chamber disposed between said spaced pairs of partitions in heat-exchange relation to the diffusion chambers of said pairs of partitions and opening into said diffusion chambers, side walls of said burner chamber being formed by said inner members of said wall means; ignition means in said burner chamber adjacent the opening to said diffusion chamber; and means responsive to the physical characteristics of the exhaust gases for bypassing a portion of said exhaust gases whereby the proportion of air admixed with the total volume of exhaust gases is reduced when the total volume of exhaust gases is increased.

References Cited in the file of this patent

UNITED STATES PATENTS

| | | |
|---|---|---|
| 1,605,484 | Thompson et al. | Nov. 2, 1926 |
| 1,789,812 | Frazer | Jan. 20, 1931 |
| 1,848,990 | Boyd et al. | Mar. 8, 1932 |
| 1,875,024 | Kryzanowsky | Aug. 30, 1932 |
| 2,203,554 | Uhri et al. | June 4, 1940 |
| 2,851,852 | Cornelius | Sept. 16, 1958 |